US010171996B2

(12) United States Patent
Goto

(10) Patent No.: US 10,171,996 B2
(45) Date of Patent: *Jan. 1, 2019

(54) COMMUNICATION APPARATUS METHOD FOR CONTROLLING COMMUNICATION APPARATUS AND PROGRAM

(71) Applicant: CANON KABUSHIKI KAISHA, Tokyo (JP)

(72) Inventor: Fumihide Goto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/585,094

(22) Filed: May 2, 2017

(65) Prior Publication Data

US 2017/0238173 A1 Aug. 17, 2017

Related U.S. Application Data

(63) Continuation of application No. 15/009,537, filed on Jan. 28, 2016, now Pat. No. 9,674,680.

(30) Foreign Application Priority Data

Jan. 30, 2015 (JP) ................................. 2015-017892

(51) Int. Cl.
*H04M 1/66* (2006.01)
*H04W 12/04* (2009.01)
(Continued)

(52) U.S. Cl.
CPC .......... *H04W 12/04* (2013.01); *G06K 7/1404* (2013.01); *H04W 4/185* (2013.01); *H04W 8/005* (2013.01); *H04W 84/12* (2013.01); *H04W 88/02* (2013.01)

(58) Field of Classification Search
CPC ...... H04W 12/12; H04W 12/06; H04W 88/02
(Continued)

(56) References Cited

U.S. PATENT DOCUMENTS

| 9,674,680 B2* | 6/2017 | Goto ..................... H04W 4/185 |
| 2010/0291954 A1* | 11/2010 | Nakajima ............... H04W 8/24 |
| | | 455/507 |
| 2012/0045059 A1* | 2/2012 | Fujinami ............... H04L 9/0866 |
| | | 380/273 |

FOREIGN PATENT DOCUMENTS

| JP | 2006-146753 A | 6/2006 |
| JP | 2012-191472 A | 10/2012 |

(Continued)

*Primary Examiner* — Nghi H Ly
(74) *Attorney, Agent, or Firm* — Canon U.S.A., Inc. IP Division

(57) ABSTRACT

A communication apparatus includes a search unit that searches for another communication apparatus identified by information obtained from a captured image, a communication parameter control unit that provides another communication apparatus with a communication parameter for performing wireless communication with an access point, and a control unit that, if the information obtained from the captured image conforms to a predetermined format, performs control based on the information obtained from the captured image such that the search unit searches for another communication apparatus identified by the information and the communication parameter control unit provides another communication apparatus detected by the search with the communication parameter, and if the information obtained from the captured image does not conform to the predetermined format, perform control such that the search unit does not search for another communication apparatus and the communication parameter control unit does not provide another communication apparatus with the communication parameter.

15 Claims, 7 Drawing Sheets

(51) Int. Cl.
*H04W 4/18* (2009.01)
*H04W 84/12* (2009.01)
*H04W 88/02* (2009.01)
*H04W 8/00* (2009.01)
*G06K 7/14* (2006.01)

(58) Field of Classification Search
USPC .................. 455/410, 411, 414.1, 418, 422.1
See application file for complete search history.

(56) References Cited

FOREIGN PATENT DOCUMENTS

| | | |
|---|---|---|
| JP | 2013-077996 A | 4/2013 |
| JP | 2013-143616 A | 7/2013 |
| WO | 2011/132761 A1 | 10/2011 |

* cited by examiner

COMMUNICATION APPARATUS METHOD FOR CONTROLLING COMMUNICATION APPARATUS AND PROGRAM

CROSS-REFERENCE TO RELATED APPLICATION

This application is a Continuation of U.S. application Ser. No. 15/009,537 filed Jan. 28, 2016, which claims the benefit of Japanese Patent Application No. 2015-017892, filed Jan. 30, 2015, which is hereby incorporated by reference herein in its entirety.

BACKGROUND

Field

Aspects of the present invention generally relate to a communication technique. In recent years, there have been increasing cases where wireless communication functions are provided in electronic devices such as a digital camera, a printer, a mobile phone, and a smartphone, and these devices are connected to a wireless network for use.

To connect an electronic device to a wireless network, it is necessary to set various communication parameters such as an encryption method, an encryption key, an authentication method, and an authentication key. As a technique for facilitating the setting of these communication parameters, there is a technique in which a mobile terminal reads a Quick Response (QR) code (registered trademark; the rest is omitted) indicating a communication parameter and displayed on an electronic device and sets the read communication parameter in an access point (the publication of Japanese Patent Application Laid-Open No. 2014-60623).

As discussed in the Japanese Patent Application Laid-Open No. 2014-60623, a communication parameter is set triggered by the capturing of a QR code, thereby enabling reduction of a cumbersome input operation by a user. However, for example, a two-dimensional barcode such as a QR code, which can encode much information, may also include various pieces of information other than information for use in setting a communication parameter. If a mobile terminal erroneously sets a communication parameter based on such information other than information to be used in setting a communication parameter, a failure may occur in a behavior of a device, and wireless communication may not be correctly performed.

SUMMARY

According to an aspect of the present invention, a communication apparatus includes a search unit configured to search for another communication apparatus identified by information obtained from a captured image, a communication parameter control unit configured to provide another communication apparatus with a communication parameter for performing wireless communication with an access point, and a control unit configured to, in a case where the information obtained from the captured image conforms to a predetermined format, perform control based on the information obtained from the captured image such that the search unit searches for another communication apparatus identified by the information and the communication parameter control unit provides another communication apparatus detected by the search with the communication parameter, and in a case where the information obtained from the captured image does not conform to the predetermined format, perform control such that the search unit does not search for another communication apparatus and the communication parameter control unit does not provide another communication apparatus with the communication parameter.

Further features of the present disclosure will become apparent from the following description of exemplary embodiments with reference to the attached drawings.

DESCRIPTION OF THE EMBODIMENTS

In the following exemplary embodiments, the process is performed of determining whether information acquired in capturing an image is information to be used in setting a communication parameter, and then setting the communication parameter based on the acquired information.

With reference to the drawings, a communication apparatus according to a first exemplary embodiment is described in detail below. A description is given below of an example where a wireless local area network (LAN) system compliant with the Institute of Electrical and Electronics Engineers (IEEE) 802.11 series is used. The communication form, however, is not limited to a wireless LAN compliant with IEEE 802.11.

Figure 3:
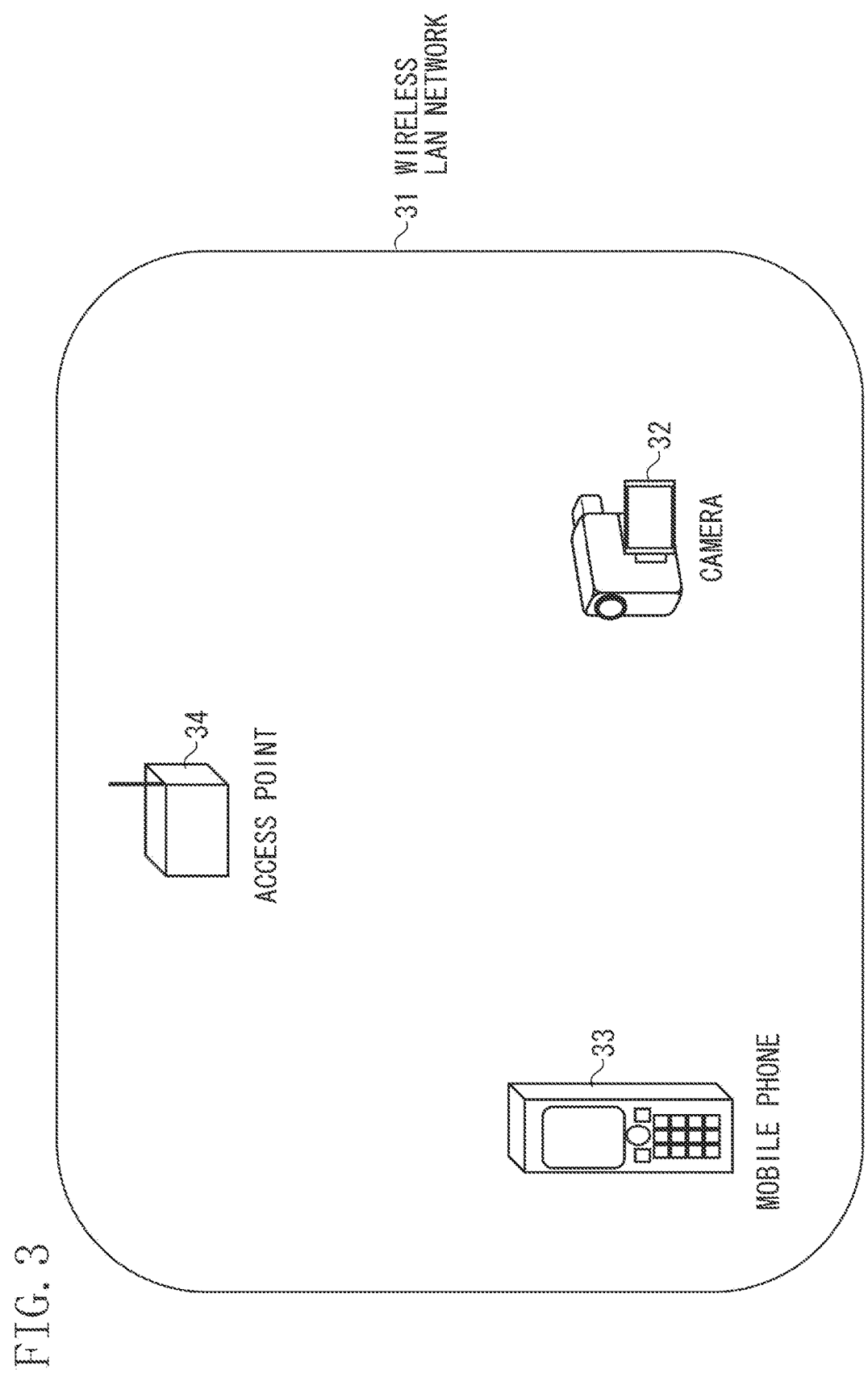
FIG. 3 is a diagram illustrating an example of a configuration of a communication system.

FIG. 3 illustrates a communication system according to the present exemplary embodiment. The communication system illustrated in FIG. 3 includes a camera 32, a mobile phone 33, an access point (hereinafter referred to as "AP") 34, and a wireless LAN network 31. A description is given below of a case where the camera 32 and the mobile phone 33 participate in the wireless LAN network 31 formed by the AP 34 and communicate with each other via the AP 34 on the wireless LAN network 31.

A description is given using a camera and a mobile phone as examples of apparatuses in the communication system according to the present exemplary embodiment. Alternatively, the apparatuses in the communication system may be other apparatuses such as a printer, a personal computer (PC), a video camera, a smartwatch, and a personal digital assistant (PDA).

Figure 1:
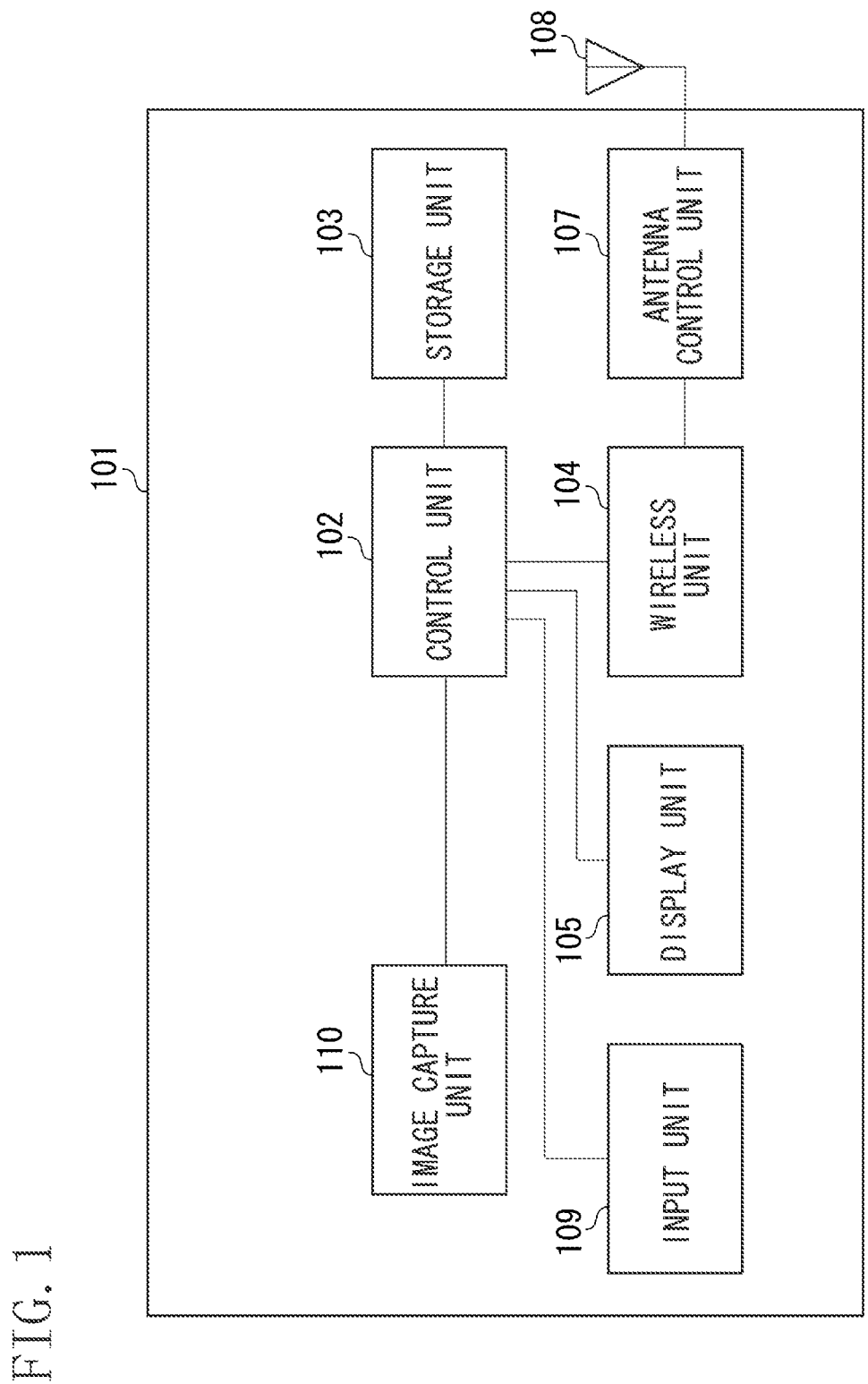
FIG. 1 is a diagram illustrating a configuration of a communication apparatus.

Next, with reference to FIG. 1, the hardware configuration of a communication apparatus 101 (each of the camera 32 and the mobile phone 33) according to the present exemplary embodiment is described. A control unit 102 executes a control program stored in a storage unit 103, thereby controlling the entirety of the apparatus. The control unit 102 includes, for example, a central processing unit (CPU). The storage unit 103 stores various pieces of information such as a control program to be executed by the control unit 102, image data, and a communication parameter. Various operations described below are performed by the control unit 102 executing a control program stored in the storage unit 103. The storage unit 103 includes a storage medium such as a hard disk drive (HDD), a flash memory, or an attachable and detachable Secure Digital (SD) card.

A wireless unit 104 performs wireless LAN communication compliant with the IEEE 802.11 series. The wireless unit 104 includes a chip for performing wireless communication. A display unit 105 performs various types of display or outputs a sound. The display unit 105 has a function of outputting visually recognizable information as a liquid crystal display (LCD) or a light-emitting diode (LED), or outputting a sound as a loudspeaker. The display unit 105 has the function of outputting at least one of visual information and sound information. The display unit 105 includes a video random-access memory (VRAM). When visual information is displayed, the VRAM holds image data corresponding to the visual information to be displayed. The display unit 105 performs display control so that an LCD or an LED continues to display the image data stored in the VRAM.

An antenna control unit 107 controls the output of an antenna 108. The antenna 108 can perform communication via a wireless LAN in the 2.4 GHz band and/or the 5 GHz band. An input unit 109 enables the operation of the communication apparatus 101 based on an input through the input unit 109, which receives various inputs from a user. The input unit 109 stores a flag corresponding to an input in a memory such as the storage unit 103. An image capture unit 110 includes an image sensor and a lens and captures a photograph and a moving image. The image capture unit 110 reads a barcode, a two-dimensional barcode, or a QR code.

Figure 2:
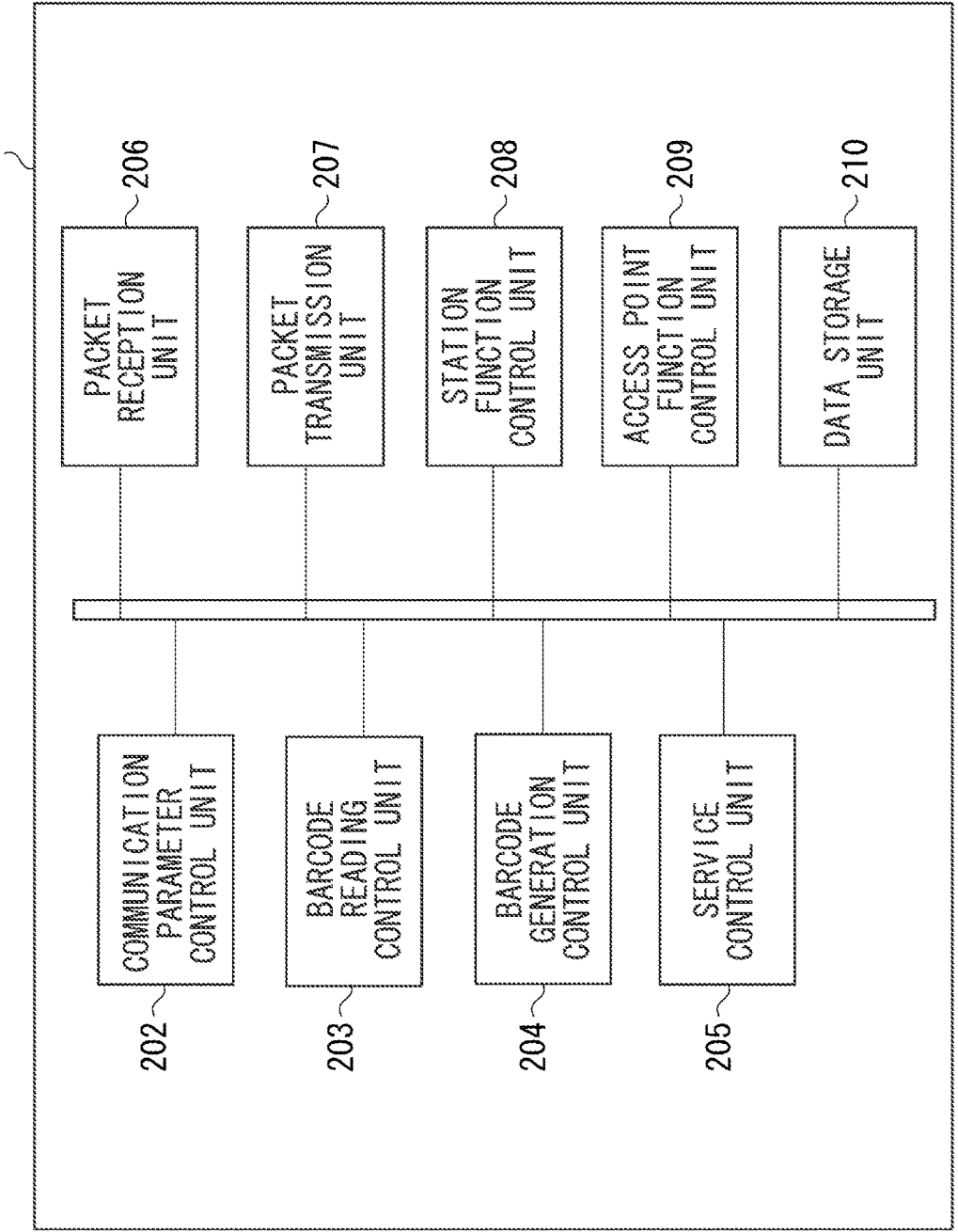
FIG. 2 is a diagram illustrating a software functional configuration of the communication apparatus.

FIG. 2 is a block diagram illustrating an example of the configuration of a software functional block for executing a communication control function. In the present exemplary embodiment, each block included in a functional block 201 of each of the camera 32 and the mobile phone 33 is stored as a program in the storage unit 103, and the program is executed by the control unit 102, thereby performing the function of the block. According to a control program, the control unit 102 controls each hardware and calculates and processes information, thereby achieving each function. Part or all of the functional block 201 may be achieved by hardware. In this case, part or all of the functional block 201 is configured by, for example, an application-specific integrated circuit (ASIC).

In FIG. 2, a communication parameter control unit 202 executes a communication parameter sharing process for sharing a communication parameter between apparatuses. In the communication parameter sharing process, a provision apparatus provides a reception apparatus with a communication parameter for performing wireless communication. The communication parameter includes wireless communication parameters necessary to perform wireless LAN communication, such as a Service Set Identifier (SSID) as a network identifier, an encryption method, an encryption key, an authentication method, and an authentication key. Further, the communication parameter may also include a media access control (MAC) address, a passphrase, an Internet Protocol (IP) address for performing communication on an IP layer, and information necessary for an upper service. The communication parameter sharing process executed by the communication parameter control unit 202 may be performed based on Wi-Fi Protected Setup (WPS) or Wi-Fi Direct, which is defined by Wi-Fi Alliance.

A barcode reading control unit 203 analyzes an image captured by the image capture unit 110 and acquires encoded information. The barcode reading control unit 203 performs the process of analyzing a barcode, a two-dimensional barcode, or a QR code.

A barcode generation control unit 204 generates a barcode, a two-dimensional barcode, or a QR code and performs control for displaying the generated barcode on the display unit 105. A service control unit 205 controls a service on an application layer. The "application layer" refers to a service provision layer among upper layers equal to or higher than layer 5 in the Open Systems Interconnection (OSI) reference model. That is, the service control unit 205 executes a printing process, an image streaming process, and a file transfer process, using wireless communication by the wireless unit 104.

A packet reception unit 206 and a packet transmission unit 207 control the transmission and reception of all packets including a communication protocol of an upper layer. Further, the packet reception unit 206 and the packet transmission unit 207 control the wireless unit 104 to transmit and receive a packet to and from a counter apparatus in compliance with the IEEE 802.11 standard.

A station function control unit 208 provides a station (STA) function of operating as an STA in the infrastructure mode defined by the IEEE 802.11 standard. The STA function control unit 208 performs an authentication/encryption process when operating as an STA. Further, an access point function control unit 209 provides an AP function of operating as an AP in the infrastructure mode defined by the IEEE 802.11 standard. The AP function control unit 209 forms a wireless network, performs an authentication/encryption process on an STA, and manages an STA. A data storage unit 210 performs control to write and read to and from software itself, and write and read a communication parameter and information of a barcode to and from the storage unit 103.

Further, the above functional block is merely an illustrative example. Alternatively, a plurality of functional blocks may form a single functional block, or any of the functional blocks may be further divided into blocks for performing a plurality of functions.

Figure 4:
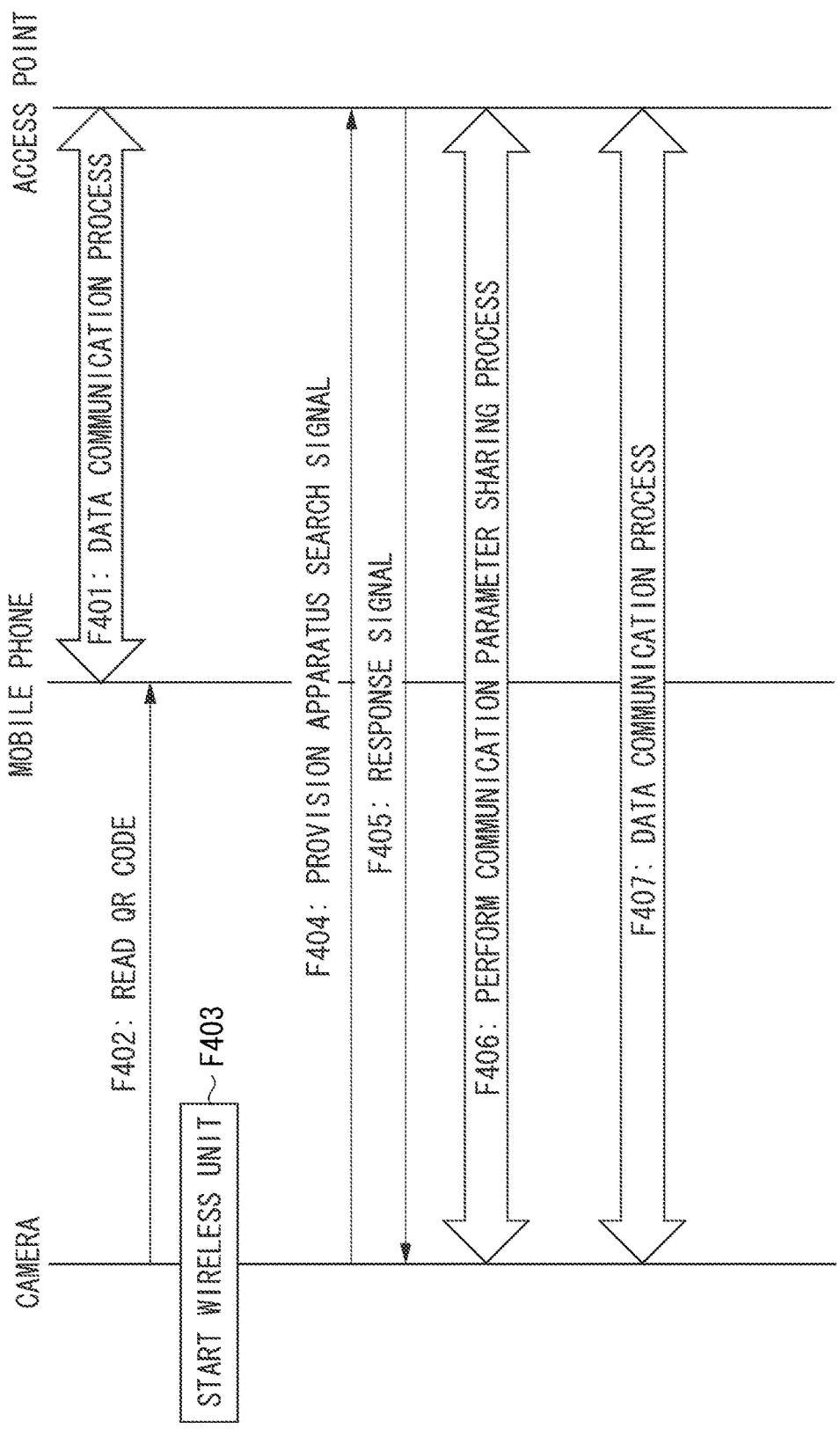
FIG. 4 is a diagram illustrating an example of a sequence of the communication system.

The operation of the communication system having the above configuration is described. FIG. 4 illustrates a connection sequence when communication is set between communication apparatuses including the camera 32, the mobile phone 33, and the AP 34. In this example, the camera 32 participates in the wireless LAN network 31 established by the AP 34. Referring to FIG. 4, in F401, the mobile phone 33 already holds a communication parameter for connecting to the wireless LAN network 31 formed by the AP 34 and performing communication and performs a data communication process via the AP 34.

To cause the camera 32 to participate in the wireless LAN network 31, the mobile phone 33 causes, according to a user operation, the display unit 105 of the mobile phone 33 to display a QR code in which information necessary to set a communication parameter for communication with the AP 34 is embedded.

In F402, by using the image capture unit 110 of the camera 32, the camera 32 reads the QR code displayed on the mobile phone 33. The camera 32 determines whether information acquired from the read QR code is information for setting a communication parameter. This determination may be made based on whether the information acquired from the read QR code conforms to a predetermined format. For example, in this determination, it is determined whether the information acquired from the QR code includes a communication parameter itself. If a communication parameter itself is included, the camera 32 determines that the acquired information is information for setting a communication parameter. If a communication parameter itself is not included, the camera 32 determines that the acquired information is not information for setting a communication parameter.

Alternatively, this determination may be made based on whether the information acquired from the QR code includes information for identifying a partner apparatus with which to perform a communication parameter sharing process. Yet alternatively, this determination may be made based on whether the information acquired from the QR code includes a public key for generating an encryption key for conveying a communication parameter when performing a communication parameter sharing process. As a method for encrypting a communication parameter using a public key when performing a communication parameter sharing process, for example, the publication of Japanese Patent Application Laid-Open No. 2013-17237 may be used.

If the information acquired from the QR code includes identification information of an apparatus and/or a public key, the camera 32 determines that the acquired information is information for setting a communication parameter. Further, if the information acquired from the QR code does not include identification information of an apparatus and/or a public key, the camera 32 determines that the acquired information is not information for setting a communication parameter. The public key may be a public key of an apparatus or a public key of a user. Further, the information for setting a communication parameter may be a certificate for conveying a communication parameter using encryption when performing a communication parameter sharing process.

Yet alternatively, this determination may be made based on whether information for identifying a partner apparatus with which to perform a communication parameter sharing process is described according to a predetermined format. For example, when the information for identifying a partner apparatus with which to perform a communication parameter sharing process is indicated by a MAC address, it is determined whether the information acquired from the QR code includes information using 48 bits, six octets, and a hexadecimal representation. If the information acquired from the QR code includes information using 48 bits, six octets, and a hexadecimal representation, the camera 32 determines that the acquired information is information for setting a communication parameter. Similarly, the presence or absence of a public key may be determined based on the number of bits, the number of octets, and the information description format of the information acquired from the QR code.

Yet alternatively, whether information for setting a communication parameter is included, may be determined based on whether there is identification information indicating a protocol of a communication parameter sharing process or information indicating a mode for performing a communication parameter sharing process. Yet alternatively, it may be determined based on whether there is identification information of a one-time password method.

Referring back to FIG. 4, in this example, a case is described where it is determined that the information acquired from the QR code read by the camera 32 in F402 includes information for setting a communication parameter. In F403, to perform a communication parameter sharing process, the camera 32 starts the wireless unit 104 of the camera 32.

In F404, based on the information of the QR code read from the mobile phone 33, the camera 32 transmits a provision apparatus search signal for searching for a parameter provision apparatus (the AP 34). This search signal may be a probe request defined by IEEE 802.11. Alternatively, the search signal may be a probe request for specifying an apparatus indicated by identification information included in the information read from the QR code.

If the provision apparatus search signal is received from the camera 32, then in F405, the AP 34 returns a response signal. In F406, as a result of the exchange of the signals in F404 and F405, the camera 32 performs a communication parameter sharing process with the AP 34 detected as a partner apparatus in the communication parameter sharing process. The camera 32 shares a communication parameter with the AP 34 using wireless communication by the wireless unit 104. Then, by using the acquired communication parameter, the camera 32 connects to the wireless LAN network 31 formed by the AP 34. Then, in F407, the camera 32 performs a data communication process via the AP 34. In the data communication in F407, the camera 32 may perform communication on the Internet to which the AP 34 is connected, or may perform an image transfer service for transmitting a captured image to the mobile phone 33 via the AP 34.

Figure 5:
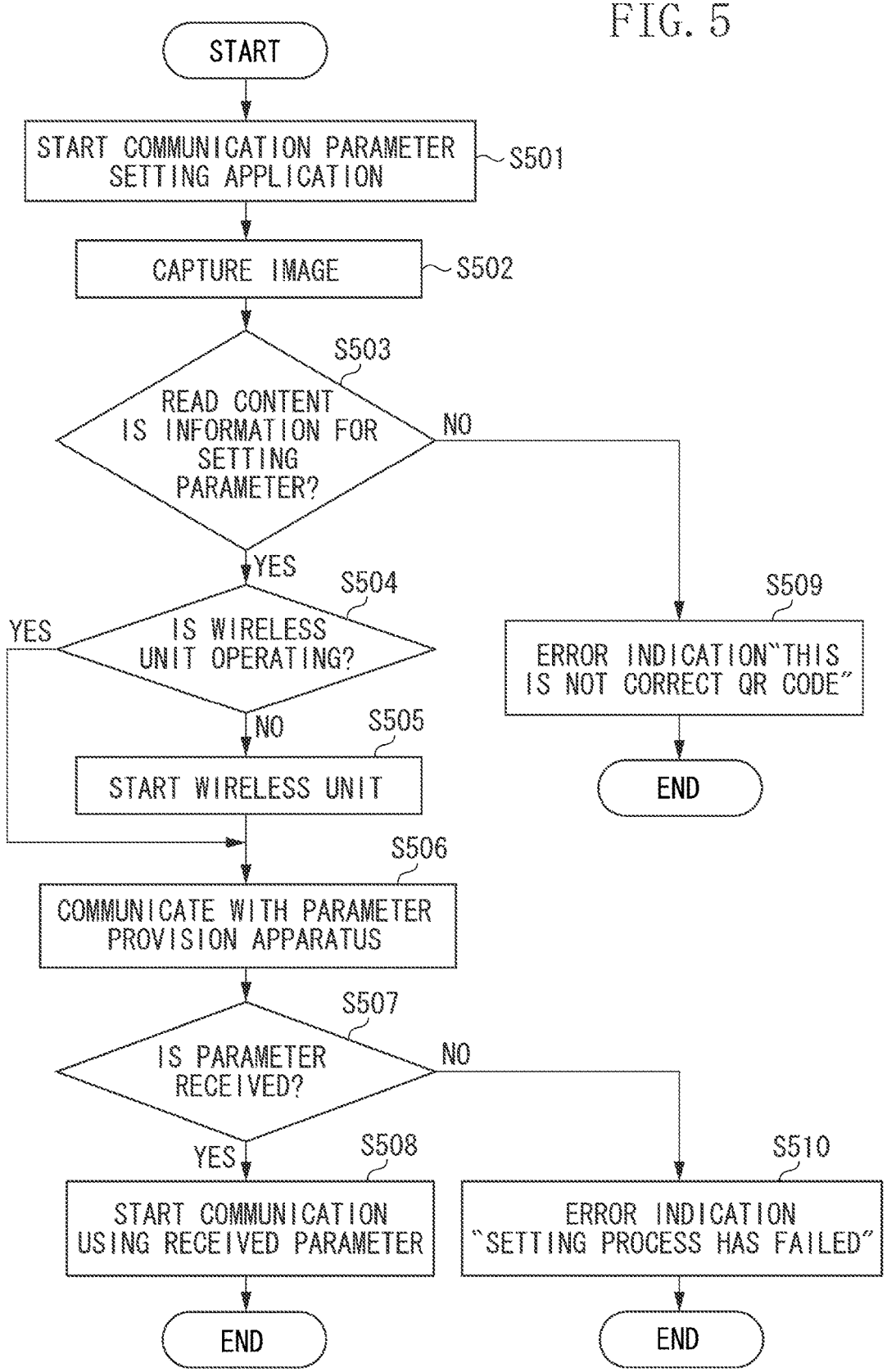
FIG. 5 is a flowchart illustrating an operation of the communication apparatus.

Next, with reference to a flowchart illustrated in FIG. 5, the above operation of the camera 32 is described. The flowchart illustrated in FIG. 5 is carried out by the control unit 102 of the camera 32. The camera 32 executes a control program stored in the storage unit 103, calculates and processes information, and controls each hardware. The configuration may be such that some or all of the steps in the flowchart illustrated in FIG. 5 are achieved by hardware such as an ASIC.

The flowchart in FIG. 5 is started when the user indicates a communication parameter setting mode through the input unit 109 of the camera 32. If set to the communication parameter setting mode, then in step S501, the camera 32 starts a communication parameter setting application. The communication parameter setting application corresponds to the communication parameter control unit 202 and is an application for performing a communication parameter sharing process.

If the communication parameter setting application is started, then in step S502, the camera 32 starts the image capture unit 110 and concurrently displays, on the display unit 105, information for giving an instruction to capture an image of a QR code. According to an operation received by the input unit 109, the camera 32 captures an image using the image capture unit 110.

When the image is captured, then in step S503, the camera 32 analyzes the captured image according to the QR code rules and decodes the captured image. The camera 32 determines the content of the QR code read in step S502. In the determination in step S503, as described above, the camera 32 determines whether information acquired from the read QR code is information for setting a communication parameter. In step S503, the camera 32 determines the type of the information acquired from the QR code. If, as a result of the determination in step S503, the content of the QR code displayed on the mobile phone 33 and read by the camera 32 is not information for setting a communication parameter, then in step S509, the camera 32 gives an error message on the display unit 105 of the camera 32, and the processing ends. Further, if the image captured in step S502 does not include a QR code, the camera 32 may give an error message on the display unit 105 of the camera 32, and then, the processing may end.

In step S509, the camera 32 produces display indicating that a QR code for setting a communication parameter is not captured in the captured image. For example, the camera 32 displays character information such as "this is not a correct QR code" on the display unit 105. Until the content of the read QR code is information for setting a communication parameter, the processing may return to step S502, and the camera 32 may repeatedly capture the QR code.

If, on the other hand, as a result of the determination in step S503, the content of the QR code displayed on the mobile phone 33 and read by the camera 32 is information for setting a communication parameter, then in step S504, the camera 32 determines whether the wireless unit 104 of the camera 32 is operating. If, as a result of the determination in step S504, the wireless unit 104 has not yet been started, then in step S505, the camera 32 starts the wireless unit 104. If the wireless unit 104 has already been started, the processing proceeds to step S506. Alternatively, if, as a result of the determination in step S503, the content of the read QR code is information for setting a communication parameter, the camera 32 may perform the processes of step S504 and subsequent steps without receiving a user operation. Furthermore, the camera 32 may inquire of the user about whether to perform the subsequent processing. If an execution instruction is received from the user, the camera 32 may perform the processes of step S504 and thereafter. When making this inquiry, the camera 32 may present identification information of an apparatus included in the read QR code to the user, thereby inquiring of the user about whether to perform a communication parameter sharing process with this apparatus.

Next, the camera 32 searches for a parameter provision apparatus (the AP 34 in FIG. 4) using the wireless unit 104. If a parameter provision apparatus is detected, then in step S506, the camera 32 performs a communication parameter sharing process with this parameter provision apparatus. This communication parameter sharing process may be performed using WPS. Next, in step S507, the camera 32 determines whether a communication parameter is received in the communication parameter sharing process performed in step S506 and the communication parameter sharing process is completed.

If it is determined in step S507 that a communication parameter is received, then in step S508, the camera 32 connects to the wireless LAN network 31 using the communication parameter received from the communication parameter provision apparatus and starts data communication via the AP 34. If, on the other hand, a communication parameter cannot be received and the communication parameter sharing process fails in step S507, then in step S510, the camera 32 displays a message such as "a setting process has failed" on the display unit 105, and the processing ends in an error.

As described above, according to the present exemplary embodiment, it is possible to determine whether information acquired by capturing an image is information to be used in setting a communication parameter, and then set the communication parameter based on the acquired information. Thus, even if an image of a QR code including information to be used in setting a communication parameter is erroneously captured, possibility of setting communication parameter based on this erroneous information is reduced. That is, even if the image of a QR code including information to be used in setting a communication parameter is erroneously captured, it is possible to reduce the occurrence of incorrect performance in wireless communication. Further, according to the present exemplary embodiment, the user can set a communication parameter by a simple operation without caring about the content of a QR code.

In the first exemplary embodiment, a case has been described where the camera 32 is set to the communication parameter setting mode, and after the communication parameter setting application is started the camera 32 reads a QR code. In a second exemplary embodiment, a case is described where a QR code is read in the state where the parameter setting application is not started in advance. The configuration of each apparatus is similar to that in the first exemplary embodiment.

Figure 6:
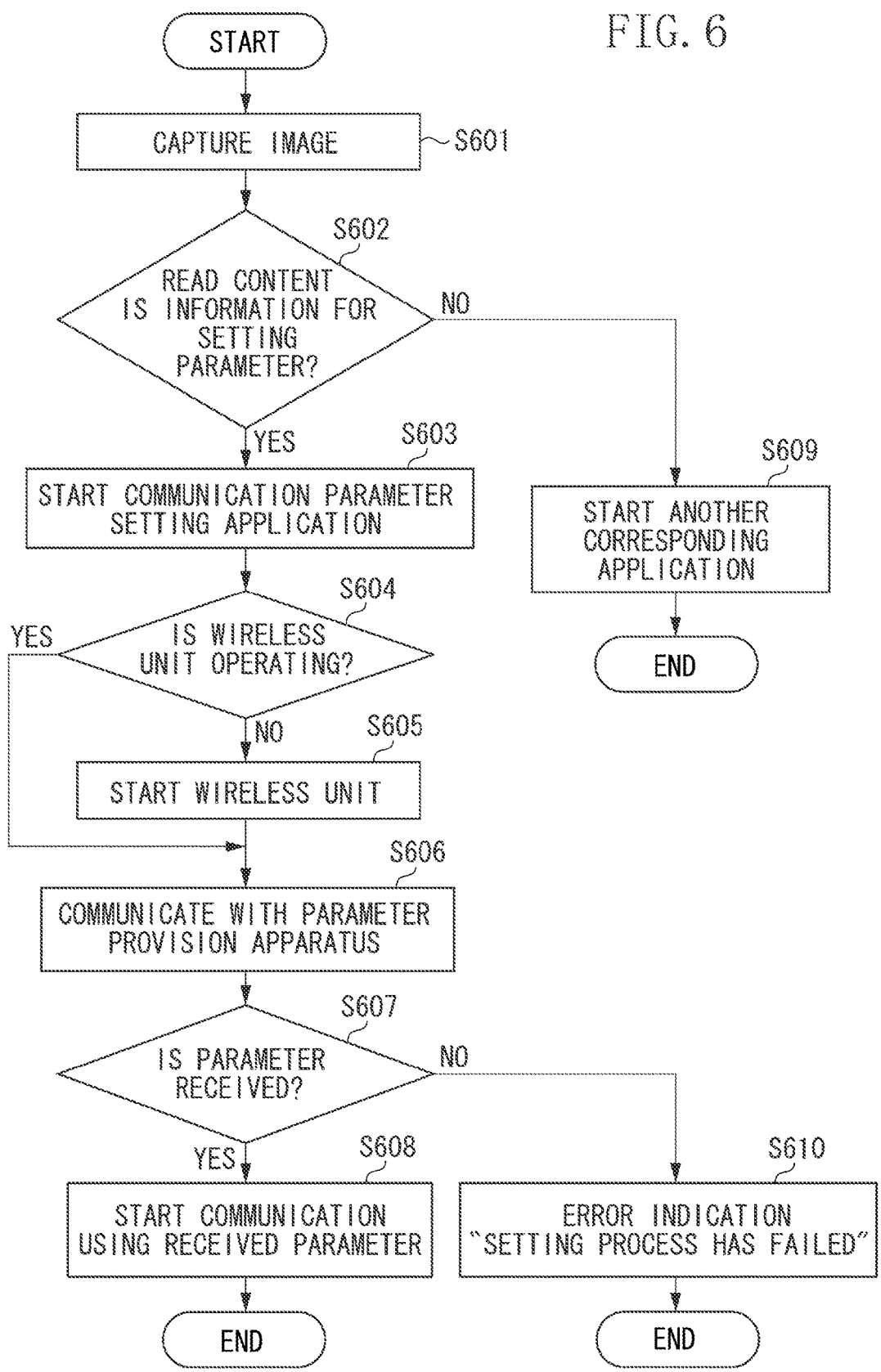
FIG. 6 is a flowchart illustrating an operation of the communication apparatus.

In the present exemplary embodiment, the mobile phone 33 is already connected to the wireless LAN network established by the AP 34, and the camera 32 newly participates in this network. With reference to a flowchart illustrated in FIG. 6, the operation of the camera 32 in the present exemplary embodiment is described. The flowchart illustrated in FIG. 6 is carried out by the control unit 102 of the camera 32 executing a control program stored in the storage unit 103, calculating and processing information, and controlling each hardware. The configuration may be such that some or all of the steps in the flowchart illustrated in FIG. 6 are carried out by hardware such as an ASIC. The flowchart in FIG. 6 is started when the user designate an image capture mode through the input unit 109 of the camera 32.

If the image capture mode is indicated, then in step S601, the camera 32 starts the image capture unit 110. According to an operation received by the input unit 109, the camera 32 captures an image using the image capture unit 110. If an image is captured, then in step S602, the camera 32 analyzes the captured image according to the QR code rules and decodes the captured image. The camera 32 determines the content of a QR code read in step S601. In the determination in step S602, similarly to the first exemplary embodiment, the camera 32 determines whether information acquired from the read QR code is information for setting a communication parameter. In the determination in step S602, the camera 32 also determines the type of the information acquired from the QR code.

If, as a result of the determination in step S602, the content of the QR code displayed on the mobile phone 33 and read by the camera 32 is not information for setting a communication parameter, then in step S609, the camera 32 starts another application corresponding to the read content. For example, if the content of the read QR code is address information such as a uniform resource locator (URL) indicating the address of a web site, then in step S609, the camera 32 starts a web browser application and accesses this address. However, in step S609, similarly to step S509, the processing may end in an error. Further, if, as a result of the determination in step S602, the type of the information acquired from the QR code is identification information of an application, the camera 32 may start an application indicated by the identification information. As described above, if the type of the information obtained from the read QR code is not a type regarding the setting of a communication parameter, the camera 32 performs processing according to the type of the information obtained from the QR code.

If, on the other hand, as a result of the determination in step S602, the content of the QR code displayed on the mobile phone 33 and read by the camera 32 is information for setting a communication parameter, then in step S603, the camera 32 starts the communication parameter setting application. In this case, the camera 32 may automatically start the communication parameter setting application without receiving a user operation. Alternatively, the camera 32 may inquire of the user about whether to start the communication parameter setting application. If an instruction to start the application is received from the user, the camera 32 may start the communication parameter setting application.

If the communication parameter setting application is started, then in step S604, the camera 32 determines whether the wireless unit 104 of the camera 32 is operating. If, as a result of the determination in step S604, the wireless unit 104 has not yet been started, then in step S605, the camera 32 starts the wireless unit 104. If the wireless unit 104 has already been started, the processing proceeds to step S606.

Next, the camera 32 searches for a parameter provision apparatus (the AP 34 in FIG. 4) using the wireless unit 104. If a parameter provision apparatus is detected, then in step S606, the camera 32 performs a communication parameter sharing process with this parameter provision apparatus. The communication parameter sharing process may be performed using WPS. Next, in step S607, the camera 32 determines whether a communication parameter has been received in the communication parameter sharing process performed in step S606.

If it is determined in step S607 that a communication parameter has been received, then in step S608, the camera 32 connects to the wireless LAN network 31 using the communication parameter received from the communication parameter provision apparatus and starts data communication via the AP 34. If, on the other hand, a communication parameter is received and the communication parameter sharing process fails in step S607, then in step S610, the camera 32 displays a message such as "a setting process has failed" on the display unit 105, and the processing ends in an error.

As described above, according to the present exemplary embodiment, the user merely needs to capture a QR code, and thereby can easily set a communication parameter, without caring about an application and a function to be used.

In the first and second exemplary embodiments, a configuration has been described where the mobile phone 33 is already connected to the AP 34, the camera 32 analyzes a QR code provided by the mobile phone 33, and searches for a communication parameter provision apparatus based on the QR code analysis. In a third exemplary embodiment, a case is described where the camera 32 is already connected to the AP 34, the camera 32 captures an image of a QR code provided by the mobile phone 33, thereby connecting the mobile phone 33 to the AP 34. The configuration of each apparatus is similar to that in the first exemplary embodiment.

Figure 7:
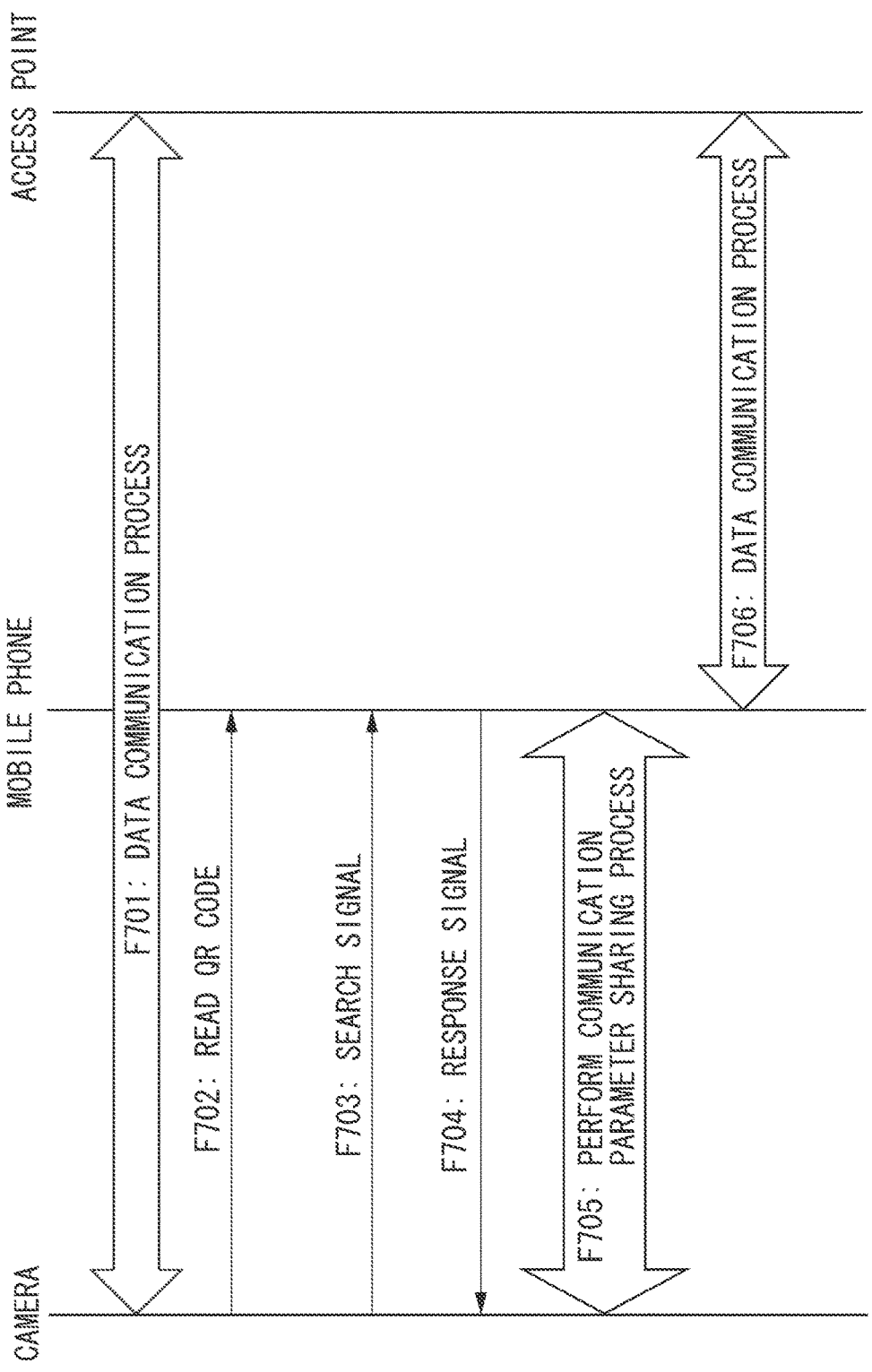
FIG. 7 is a diagram illustrating an example of a sequence of the communication system.

FIG. 7 illustrates a connection sequence when communication is set between communication apparatuses including the camera 32, the mobile phone 33, and the AP 34 according to the present exemplary embodiment. In this example, a case is described where the mobile phone 33 participates in the wireless LAN network 31 established by the AP 34. Referring to FIG. 7, in F701, the camera 32 already holds a communication parameter for connecting to the wireless LAN network 31 formed by the AP 34 to perform communication and performs a data communication process via the AP 34.

To participate in the wireless LAN network 31 established by the AP 34, the mobile phone 33 causes, according to a user operation, the display unit 105 of the mobile phone 33 to display a QR code in which information for setting a communication parameter for communication with the AP 34 is embedded. The information for setting a communication parameter is identification information of the mobile phone 33 and information indicating a request for a communication parameter.

In F702, by using the image capture unit 110 of the camera 32, the camera 32 reads the QR code displayed on the mobile phone 33. The camera 32 determines whether information acquired from the read QR code is information for setting a communication parameter. If it is determined that the information acquired from the QR code read by the camera 32 in F702 includes information for setting a communication parameter, then in F703, by using the wireless unit 104, the camera 32 transmits a search signal for searching for an apparatus indicated by the read identification information. This search signal may be a probe request defined by IEEE 802.11. Alternatively, the search signal may be a probe request for specifying an apparatus indicated by the identification information included in the information read from the QR code.

If the search signal is received from the camera 32, then in F704, the mobile phone 33 returns a response signal. In F705, the camera 32 performs a communication parameter sharing process with the mobile phone 33 detected as a communication partner in the communication parameter sharing process as a result of the exchange of the signals in F703 and F704. Performing wireless communication with the wireless unit 104, the camera 32 provides the mobile phone 33 with a communication parameter for connecting to the wireless LAN network 31 formed by the AP 34 and carrying out communication.

By using the communication parameter acquired from the camera 32, the mobile phone 33 connects to the wireless LAN network 31 formed by the AP 34. Then, in F706, the mobile phone 33 performs a data communication process via the AP 34. In the data communication in F707, the mobile phone 33 may perform communication on the Internet to which the AP 34 is connected, or may perform an image transfer service for transmitting a captured image to the camera 32 via the AP 34.

As described above, according to the present exemplary embodiment, if, in response to the capturing of a QR code, the camera 32 recognizes the mobile phone 33 requesting the reception of a communication parameter, the camera 32 can provide the mobile phone 33 with a communication parameter for a network to which the camera 32 is currently connected.

In a fourth exemplary embodiment, a case is described where a QR code includes a public key as information for setting a communication parameter. In the present exemplary embodiment, a case is described where in the state where the camera 32 is already connected to the AP 34, the camera 32 captures an image of a QR code of the mobile phone 33, thereby connecting the mobile phone 33 to the AP 34. The configuration of each apparatus is similar to that in the first exemplary embodiment.

A description is given of a connection sequence when communication is set between communication apparatuses including the camera 32, the mobile phone 33, and the AP 34 according to the present exemplary embodiment. In this example, a case is described where the mobile phone 33 participates in the wireless LAN network 31 established by the AP 34. A case is described where the camera 32 already holds a communication parameter for connecting to the wireless LAN network 31 formed by the AP 34 to perform communication and carries out a data communication process via the AP 34.

To participate in the wireless LAN network 31 established by the AP 34, the mobile phone 33 causes, according to a user operation, the display unit 105 of the mobile phone 33 to display a QR code in which information for setting a communication parameter for communication with the AP 34 is embedded. The information for setting a communication parameter is identification information of the mobile phone 33 and information of a public key of the mobile phone 33.

By using the image capture unit 110 of the camera 32, the camera 32 reads the QR code displayed on the mobile phone 33. The camera 32 determines whether information acquired from the read QR code is information for setting a communication parameter. The camera 32 also determines the type of the information acquired from the read QR code. If it is determined that the information acquired from the QR code read by the camera 32 includes, for example, identification information of an apparatus, the camera 32 transfers the information read from the QR code to the AP 34, using the wireless unit 104. That is, the camera 32 transmits, to the AP 34, the identification information of the mobile phone 33 read from the QR code and a request for a communication parameter.

It is assumed that this transfer is performed using the wireless LAN network 31, which is a secure link established between the camera 32 and the AP 34. Alternatively, this transfer may be performed using a secure link different from the wireless LAN network 31. For example, this transfer may be performed using secure proximity wireless communication such as near field communication (NFC). Alternatively, this transfer may be performed using communication other than wireless LAN such as Bluetooth®. Alternatively, the camera 32 may cause the display unit 105 of the camera 32 to display the identification information of the mobile phone 33 read from the acquired QR code and the request for a communication parameter, and cause the AP 34 to read the identification information and the request, thereby performing the transfer.

If it is determined that the information acquired from the QR code is not information for setting a communication parameter, and if the QR code is captured in the communication parameter setting mode, the camera 32 performs the process described in step S509. Further, if it is determined that the information acquired from the QR code is not information for setting a communication parameter, and if the QR code is captured in a state other than the communication parameter setting mode, the camera 32 performs the process described in step S609.

If the information for setting a communication parameter is received from the camera 32, the AP 34 transmits a search signal for searching for a parameter reception apparatus (the mobile phone 33) indicated by the identification information included in this information. This search signal may be a probe request defined by IEEE 802.11. Alternatively, the search signal may be a probe request for specifying an apparatus indicated by the identification information.

If the search signal is received from the AP 34, the mobile phone 33 returns a response signal. As a result of the exchange of the search signal and the response signal, the AP 34 and the mobile phone 33 can detect each other as communication partners in a communication parameter sharing process.

According to the above exemplary embodiment, the AP 34 transmits a search signal to search for the mobile phone 33 serving as a reception apparatus. Alternatively, the mobile phone 33 may transmit a search signal to search for the AP 34 serving as a provision apparatus. In this case, as soon as the mobile phone 33 displays a QR code, the mobile phone 33 starts transmitting a search signal. After the AP 34 receives identification information of an apparatus and a request for a communication parameter from the camera 32, the AP 34 waits for a search signal from an apparatus (the mobile phone 33) indicated by the received identification information. If a search signal is received from the apparatus (the mobile phone 33) indicated by the received identification information, the AP 34 transmits a response signal to which identification information of a communication parameter sharing process or information indicating that a communication parameter sharing process is being performed is added. If a response signal is received to which identification information of a communication parameter sharing process or information indicating that a communication parameter sharing process is being performed is added, the mobile phone 33 recognizes that the transmission source of the response signal is a partner apparatus in the communication parameter sharing process, and then performs the subsequent processing. If a response signal is received to which identification information of a communication parameter sharing process or information indicating that a communication parameter sharing process is being performed is not added, the mobile phone 33 ignores this response signal. Alternatively, the mobile phone 33 may not execute a communication parameter sharing process with the transmission source of this response signal.

Next, the mobile phone 33 and the AP 34 having detected each other, perform the communication parameter sharing process. In this communication parameter sharing process, the mobile phone 33 and the AP 34 may exchange, for example, a communication parameter encrypted using a public key as discussed in the publication of Japanese Patent Application Laid-Open No. 2013-17237.

By using the communication parameter acquired from the AP 34, the mobile phone 33 connects to the wireless LAN network 31 formed by the AP 34. Then, the mobile phone 33 performs a data communication process via the AP 34. In this data communication, the mobile phone 33 may perform communication on the Internet to which the AP 34 is connected, or may perform an image transfer service for transmitting a captured image to the camera 32 via the AP 34.

As described above, according to the present exemplary embodiment, it is possible to set a communication parameter by maintaining its security, while maintaining the convenience that a communication parameter is set in response to the capturing of a QR code as a trigger.

(Other Exemplary Embodiments)

In the above exemplary embodiments, a configuration has been described in which apparatuses exchange information for setting a communication parameter, using an image of a QR code. Alternatively, instead of the capturing of a QR code, wireless communication such as NFC or Bluetooth® may be used. Alternatively, wireless communication such as IEEE 802.11ad or TransferJet® may be used.

A QR code to be read is not limited to a QR code displayed on a display unit, but can be, for example, a QR code attached in the form of a seal, etc. to the housing of a communication device. A QR code to be read may also be attached to an instruction manual or a package, such as a corrugated fiberboard, used to contain a communication device for transportation and sale. Instead of a QR code, a barcode or a two-dimensional barcode may also be used to implement the above-described embodiments. Alternatively, instead of machine-readable information, such as a QR code, the above-described embodiments can be implemented using information readable by a user.

Operations of the above-described first to fourth exemplary embodiments may be combined as needed. Examples of combinations include, for example, if the camera 32 reads a QR code without participating in the wireless LAN network 31, the camera 32 performs the operation of the first or second exemplary embodiment according to whether the camera 32 is in the communication parameter setting mode when reading the QR code. In this case, if the camera is in the communication parameter setting mode when reading the QR code without participating in the wireless LAN network 31, the camera 32 performs the operation of the first exemplary embodiment. Further, if the camera 32 is not in the communication parameter setting mode when reading the QR code without participating in the wireless LAN network 31, the camera 32 performs the operation of the second exemplary embodiment. Further, if the camera 32 reads a QR code participating in the wireless LAN network 31, the camera 32 performs the operation of the third or fourth exemplary embodiment according to an instruction from the user. Before a QR code is read, the user may set in advance whether the third or fourth exemplary embodiment is to be performed. Alternatively, when a QR code is read, the user may be prompted whether the third or fourth exemplary embodiment is to be performed.

According to an operation of the user, the camera may select which of the operations of the first to fourth exemplary embodiments is to be performed.

According to the above exemplary embodiments, after determining whether information acquired by capturing an image is information to be used in setting a communication parameter, the process of setting the communication parameter based on the acquired information can be performed.

Aspects of the present invention can also be achieved by the process of supplying a program for achieving one or more functions of the above exemplary embodiments to a system or an apparatus via a network or a storage medium, and causing one or more processors of a computer of the system or the apparatus to read and execute the program. Alternatively, aspects of the present invention can also be achieved by a circuit (e.g., an ASIC) for achieving one or more functions.

Other Embodiments

Embodiment(s) of aspects of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions.

The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-Ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

What is claimed is:

1. A communication apparatus comprising:
   a computer for causing the communication apparatus to:
   determine whether information obtained from a captured image includes a public key to be used for providing processing for providing a communication parameter;
   search for another communication apparatus identified by the information obtained from the captured image;
   provide the communication parameter that is encrypted to the searched another communication apparatus in the providing processing using the public key in a case where it is determined that the information obtained from the captured image includes the public key, wherein the communication parameter is used for connecting to a wireless network formed by an external access point; and
   not perform the providing processing using the information obtained from the captured image in a case where it is determined that the information obtained from the captured image does not include the public key.

2. The communication apparatus according to claim 1, wherein the computer includes one or more circuits and/or one or more processors.

3. The communication apparatus according to claim 1, wherein the computer causes the communication apparatus to perform processing according to a type of the information obtained from the captured image in a case where it is determined that the information does not include the public key.

4. The communication apparatus according to claim 1, wherein the computer causes the communication apparatus to end a mode for providing a communication parameter for wirelessly communicating with an access point or receive an input of another captured image in a case where it is determined that the information obtained from the captured image does not include the public key.

5. The communication apparatus according to claim 1, wherein the computer causes the communication apparatus to search for another communication apparatus to which the communication parameter is to be provided by wireless communication in a case where it is determined that the information obtained from the captured image includes the public key.

6. The communication apparatus according to claim 1, wherein the computer causes the communication apparatus to display information indicating an error in a case where it is determined that the information obtained from the captured image does not include the public key.

7. The communication apparatus according to claim 1, wherein the computer causes the communication apparatus to capture a bar code, a two-dimensional code, or a Quick Response (QR) code®, and wherein the determination is performed based on information included in the captured bar code, two-dimensional code, or QR code®.

8. The communication apparatus according to claim 1, wherein in a case where it is determined that the information obtained from the captured image does not include the public key and the information obtained from the captured image includes a URL, the computer causes the communication apparatus to communicate according to the URL.

9. The communication apparatus according to claim 1, wherein in a case where it is determined that the information obtained from the captured image does not include the public key and the information obtained from the captured image includes identification information on an application, the computer causes the communication apparatus to start an application indicated by the identification information on the application.

10. The communication apparatus according to claim 1, wherein the communication parameter includes at least one of a Service Set Identifier (SSID), an encryption key, an encryption method, an authentication key, or an authentication method.

11. The communication apparatus according to claim 1, wherein the communication parameter to be provided by the communication apparatus is information for performing communication compliant with the Institute of Electrical and Electronics Engineers (IEEE) 802.11 standard.

12. The communication apparatus according to claim 1, wherein the computer causes the communication apparatus to encrypt the communication parameter using the public key in the providing processing.

13. The communication apparatus according to claim 1, wherein the computer causes the communication apparatus to provide the communication parameter to an apparatus that displays the image.

14. A communication method performed by a communication apparatus, the communication method comprising:
    determining whether information obtained from a captured image includes a public key to be used for providing processing for providing a communication parameter;
    searching for another communication apparatus identified by the information obtained from the captured image;
    providing the communication parameter that is encrypted to the searched another communication apparatus in the providing processing using the public key in a case where it is determined that the information obtained from the captured image includes the public key, wherein the communication parameter is used for connecting to a wireless network formed by an external access point; and
    not performing the providing processing using the information obtained from the captured image in a case where it is determined that the information obtained from the captured image does not include the public key.

15. A non-transitory storage medium storing a program for causing a computer to perform a communication method, the communication method comprising:
    determining whether information obtained from a captured image includes a public key to be used for providing processing for providing a communication parameter;
    searching for another communication apparatus identified by the information obtained from the captured image;
    providing the communication parameter that is encrypted to the searched another communication apparatus in the providing processing using the public key in a case where it is determined that the information obtained from the captured image includes the public key, wherein the communication parameter is used for connecting to a wireless network formed by an external access point; and
    not performing the providing processing using the information obtained from the captured image in a case where it is determined that the information obtained from the captured image does not include the public key.

* * * * *